US010696762B2

(12) United States Patent
Smedberg et al.

(10) Patent No.: US 10,696,762 B2
(45) Date of Patent: Jun. 30, 2020

(54) CROSSLINKED POLYMER COMPOSITION, STRUCTURED LAYER AND CABLE

(71) Applicant: BOREALIS AG, Vienna (AT)

(72) Inventors: Annika Smedberg, Myggenäs (SE); Villgot Englund, Göteborg (SE); Per-Ola Hagstrand, Stenungsund (SE); Virginie Erikson, Stenungsund (SE); Emy Silfverberg, Lerum (SE)

(73) Assignee: BOREALIS AG, Vienna (AT)

( * ) Notice: Subject to any disclaimer, the term of this patent is extended or adjusted under 35 U.S.C. 154(b) by 247 days.

(21) Appl. No.: 15/504,903

(22) PCT Filed: Aug. 19, 2015

(86) PCT No.: PCT/EP2015/068989
§ 371 (c)(1),
(2) Date: Feb. 17, 2017

(87) PCT Pub. No.: WO2016/026878
PCT Pub. Date: Feb. 25, 2016

(65) Prior Publication Data
US 2017/0233508 A1 Aug. 17, 2017

(30) Foreign Application Priority Data

Aug. 19, 2014 (EP) .................................... 14181348

(51) Int. Cl.
| | |
|---|---|
| C08F 110/02 | (2006.01) |
| C08F 210/18 | (2006.01) |
| H01B 3/44 | (2006.01) |
| B32B 1/08 | (2006.01) |
| B32B 27/32 | (2006.01) |
| B32B 27/08 | (2006.01) |
| C08K 5/14 | (2006.01) |
| H01B 9/02 | (2006.01) |
| C08F 2/02 | (2006.01) |

(52) U.S. Cl.
CPC ............. *C08F 110/02* (2013.01); *B32B 1/08* (2013.01); *B32B 27/08* (2013.01); *B32B 27/32* (2013.01); *C08F 210/18* (2013.01); *C08K 5/14* (2013.01); *H01B 3/441* (2013.01); *H01B 9/027* (2013.01); *B32B 2250/24* (2013.01); *B32B 2264/108* (2013.01); *B32B 2307/202* (2013.01); *B32B 2307/206* (2013.01); *B32B 2307/306* (2013.01); *B32B 2307/308* (2013.01); *B32B 2307/50* (2013.01); *B32B 2307/554* (2013.01); *B32B 2307/714* (2013.01); *B32B 2307/72* (2013.01); *B32B 2457/00* (2013.01); *B32B 2597/00* (2013.01); *C08F 2/02* (2013.01)

(58) Field of Classification Search
CPC ......... H01B 9/027; C08K 5/14; C08F 110/02; C08F 210/18; B32B 1/08; B32B 27/32; B32B 27/08

See application file for complete search history.

(56) References Cited

U.S. PATENT DOCUMENTS

| | | | |
|---|---|---|---|
| 3,401,020 A | 9/1968 | Kester et al. | |
| 3,922,335 A | 11/1975 | Jordan et al. | |
| 4,340,577 A | 7/1982 | Sugawara et al. | |
| 4,391,789 A | 7/1983 | Estopinal | |
| 2012/0305284 A1* | 12/2012 | Nilsson ................... | C08F 10/02 174/110 SR |
| 2013/0000947 A1* | 1/2013 | Smedberg ............. | C08F 210/02 174/110 SR |

FOREIGN PATENT DOCUMENTS

| | | |
|---|---|---|
| EP | 0629222 | 12/1994 |
| EP | 2499172 | 9/2012 |
| EP | 2499197 | 3/2017 |

(Continued)

OTHER PUBLICATIONS

Encyclopedia of Polymer Science and Engineering, vol. 6, 1986, pp. 383-410.
Klimesch, R., et al., "Polyethylene: High-pressure," Encyclopedia of Materials: Science and Technology, Elsevier Science Ltd., 2001, pp. 7181-7184.
Randall, J.C., "A Review of High Resolution Liquid 13Carbon Nuclear Magnetic Resonance Characterizations of Ethylene-Based Polymers," Journal of Macromolecular Science, Part C: Polymer Reviews, vol. 29, Issues 2-3, 1989, pp. 201-317.

(Continued)

*Primary Examiner* — Peter D. Mulcahy
(74) *Attorney, Agent, or Firm* — Meunier Carlin & Curfman LLC

(57) ABSTRACT

The present invention relates to a crosslinked polymer composition comprising a crosslinked polyolefin, wherein the polymer composition comprises, prior to crosslinking, a polyolefin and peroxide which is in an amount of less than 35 mmol —O—O-/kg polymer composition, characterized in that the crosslinked polymer composition has been in a direct contact with a semiconductive composition for 24 h at 70° C., and that the crosslinked polymer composition thereafter has an electrical DC-conductivity of 150 fS/m or less, wherein the electrical DC-conductivity is measured in accordance with "DC conductivity method", as described under "Determination methods", on a plaque of the crosslinked polymer composition at 70° C. and 30 kV/mm mean electric field from a non-degassed and 1 mm thick plaque sample of the crosslinked polymer composition; a layered structure, cable, e.g. a power cable, use of the crosslinked polymer composition and the structured layer, both, for producing a crosslinked power cable, e.g., a cross linked direct current (DC) power cable; and a process for producing a cable.

10 Claims, No Drawings

(56) References Cited

FOREIGN PATENT DOCUMENTS

| | | |
|---|---|---|
| WO | 9308222 | 4/1993 |
| WO | 9635732 | 11/1996 |
| WO | 2006131266 A1 | 12/2006 |
| WO | 2009007116 A1 | 1/2009 |
| WO | 2009007119 A2 | 1/2009 |
| WO | 2010003650 | 1/2010 |
| WO | 2010003651 A1 | 1/2010 |
| WO | 2011-057927 A1 † | 5/2011 |
| WO | 2011-057928 A1 † | 5/2011 |
| WO | 2011057925 | 5/2011 |
| WO | 2011057926 | 5/2011 |
| WO | 2011057927 | 5/2011 |
| WO | 2011057928 | 5/2011 |
| WO | 2011113685 | 9/2011 |
| WO | 2011113686 | 9/2011 |
| WO | 2011128147 | 10/2011 |
| WO | 2012059483 | 5/2012 |
| WO | 2012150285 | 11/2012 |

OTHER PUBLICATIONS

International Search Report and Written Opinion dated Oct. 28, 2015 in related application No. PCT/EP2015/068989 (9 pages).

\* cited by examiner
† cited by third party

CROSSLINKED POLYMER COMPOSITION, STRUCTURED LAYER AND CABLE

FIELD OF INVENTION

The invention relates to a polymer composition, a crosslinked polymer composition, a power cable insulation, and a power cable, which polymer composition, crosslinked polymer composition, power cable insulation, and power cable, may be especially useful in high voltage (HV) and extra high voltage (EHV) cable applications, for example, high voltage direct current (HV DC) applications and extra high voltage direct current (EHV DC) applications. The invention further relates to a method for reducing, i.e. for providing low, electrical DC conductivity of a crosslinked polymer composition, and to the use of the polymer composition and of the crosslinked polymer composition.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition have a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In the crosslinking reaction of a polymer interpolymer crosslinks (bridges) are primarily formed. Crosslinking can be achieved using e.g. a free radical generating compound, such as a peroxide. Free radical generating agent is typically incorporated to the layer material prior to, or during, the extrusion of the layer(s) on a conductor. After formation of the layered cable, the cable is then subjected to a crosslinking step where the radical formation is initiated and thereby crosslinking reaction.

Peroxides are very common free radical generating compounds used i.a. in the polymer industry for said polymer modifications. The resulting decomposition products of peroxides may include volatile by-products which are undesired, since they may have a negative influence on the electrical properties of the cable. Therefore the volatile decomposition products such as methane e.g. where, for example, dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size.

Electrical Conductivity

The electrical DC conductivity here after denominated as DC conductivity is an important material property e.g. for insulating materials for high voltage direct current (HV DC) cables. First of all, the temperature and electric field dependence of this property will influence the resulting electric field. The second issue is the fact that heat will be generated inside the insulation by the electric leakage current flowing between the inner and outer semiconductive layers. This leakage current depends on the electric field and the DC conductivity of the insulation. High DC conductivity of the insulating material can even lead to thermal runaway under high stress/high temperature conditions. The DC conductivity must therefore be sufficiently low to avoid thermal runaway.

Accordingly, in HVDC cables, the insulation is heated by the leakage current. For a specific cable design the heating is proportional to the insulation conductivity×(electrical field). Thus, if the electric field is increased, far more heat will be generated.

There are high demands to increase the voltage of a power cable to achieve an increased power transmission, for example, of DC power cable, and, e.g., EP2499172 provides a polymer composition which comprises a polyolefin and which has properties making it suitable for a DC power cable.

However, there is still a continuous need to find alternative polymer compositions with reduced DC conductivity. Such polymer compositions should suitably also have good mechanical properties required for demanding power cable embodiments.

OBJECTS OF THE INVENTION

One of the objects of the present invention is to provide a crosslinked polymer composition comprising a crosslinked polyolefin, and which crosslinked polymer composition has surprisingly advantageous properties suitable for a power cable, e.g. a DC power cable.

A further object of the invention is to provide a layered structure which comprises a polymer layer and at least one semiconductive layer adjacent to said polymer layer, which polymer layer comprises a crosslinked polymer layer composition.

Still a further object of the invention is to provide a cable which comprises the crosslinked polymer composition or the layered structure, both of the present invention.

Another object of the invention is to provide use of the crosslinked polymer composition, or the structured layer, for producing a crosslinked power cable, e.g., a crosslinked DC power cable, all in accordance with the present invention.

An even further object of the invention is to provide a process for producing a cable or a structured layer.

The invention and further objects thereof are described and defined in details herein.

DESCRIPTION OF THE INVENTION

The present invention provides a crosslinked polymer composition comprising a crosslinked polyolefin, wherein the polymer composition comprises, prior to crosslinking, a polyolefin and peroxide which is in an amount of less than 35 mmol —O—O—/kg polymer composition, characterized in that the crosslinked polymer composition has been in a direct contact with a semiconductive composition for 24 h at 70° C., and that the crosslinked polymer composition thereafter has an electrical conductivity of 150 fS/m or less, wherein the DC conductivity is measured in accordance with "DC conductivity method", as described under "Determination methods", on a plaque of the crosslinked polymer composition at 70° C. and 30 kV/mm mean electric field from a non-degassed and 1 mm thick plaque sample of the crosslinked polymer composition.

The crosslinked polymer composition or the crosslinked polyolefin, respectively, is crosslinked via radical reaction using the amount, as described herein, of peroxide present in the polymer composition before crosslinking. The crosslinked polymer composition has a typical network, i.a. interpolymer crosslinks (bridges), as well known in the field. As evident for a skilled person, the crosslinked polymer can be and is defined herein with features that are present in the polymer composition or polyolefin before or after the crosslinking, as stated or evident from the context. For instance, the amounts of the polyolefin, peroxide and any antioxidant, as well as the presence and the amount of 2,4-Diphenyl-4-methyl-1-pentene, in the polymer composition or the type and compositional properties, such as MFR, density and/or unsaturation degree, of the polyolefin component are defined, unless otherwise stated, before crosslinking. Moreover, the features after the crosslinking are, e.g., the DC conductivity, crosslinking degree or mechanical properties measured from the crosslinked polymer composition.

The unit "mmol —O—O-/kg polymer composition" means herein the content (mmol) of peroxide functional groups per kg polymer composition, when measured from the polymer composition prior to crosslinking. For instance, 35 mmol —O—O-/kg polymer composition corresponds to 0.95 wt % of the well known dicumyl peroxide based on the total amount (100 wt %) of the polymer composition.

As described earlier in EP2499172, the DC conductivity of a crosslinked polymer composition is reduced, i.e. lower, when crosslinked using a peroxide (e.g. a well known dicumyl peroxide) in a low amount as defined herein, compared to the DC conductivity obtained after crosslinking the same polymer material using the same peroxide, but in typical amounts of 37 to 55 mmol —O—O-/kg polymer composition, which corresponds to 1.0 to 2.5 wt % of dicumyl peroxide, conventionally used for crosslinking of power cables.

The crosslinked polymer composition according to the present invention has shown surprisingly advantageous properties, for example, a superior robustness towards interactions. Thus, the crosslinked polymer composition according to the present invention has, after being in direct contact with a semiconductive composition, shown an electrical conductivity that is maintained on an unexpectedly low level. The crosslinked polymer composition according to the present invention, and a reference polymer composition, have both been in a direct contact with said semiconductive composition for 24 h at 70° C. in accordance with the conditioning step of the "DC conductivity method", as described under "Determination methods", wherein the crosslinked polymer composition according to the present invention has shown an DC conductivity that is maintained on an unexpectedly low level.

The maintained low DC conductivity of the crosslinked polymer composition after external contact contributes to the advantageous electrical properties of the crosslinked polymer composition of the present invention and is measured in accordance with "DC conductivity method", as described herein under "Determination methods".

The maintained low DC conductivity of the crosslinked polymer composition, which contributes to the advantageous electrical properties of the layered structure and of the cable, both of the invention, is characterized and expressed herein using "DC conductivity method", as described herein under "Determination methods".

The present invention further provides a crosslinked polymer composition comprising a crosslinked polyolefin, wherein the polymer composition comprises prior to crosslinking (i.e. before it is crosslinked) a polyolefin and peroxide which is in an amount of 34 mmol —O—O-/kg polymer composition or less, for example, 33 mmol —O—O-/kg polymer composition or less, e.g., 5.0 to 30 mmol —O—O-/kg polymer composition, for example, 7.0 to 30 mmol —O—O-/kg polymer composition, e.g., 10.0 to 30 mmol —O—O-/kg polymer composition, for example, 15 to 30 mmol —O—O-/kg polymer composition.

The maintained low DC conductivity of the crosslinked polymer composition according to the present invention is very advantageous i.a. in a power cable, for example, in an AC or DC power cable, e.g., in direct current (DC) power cables, for example, in low voltage (LV), medium voltage (MV), high voltage (HV) or extra high voltage (EHV) DC cables, for example, in DC power cables operating at any voltages, for example, at higher than 320 kV, such as EHV DC cables.

In a further embodiment of the present invention it is provided a crosslinked polymer composition as described herein, wherein the polyolefin is a low density polyethylene (LDPE) which is selected from an optionally unsaturated LDPE homopolymer or an optionally unsaturated LDPE copolymer of ethylene with one or more comonomer(s).

The invention is further directed to a crosslinked polymer composition as described herein, wherein the polyolefin is an unsaturated LDPE copolymer of ethylene with at least one polyunsaturated comonomer and optionally with one or more other comonomer(s), wherein the polyunsaturated comonomer, for example, consists of a straight carbon chain with at least 8 carbon atoms and at least 4 carbons between the non-conjugated double bonds, of which at least one is terminal, for example, said polyunsaturated comonomer is a diene, e.g., a diene which comprises at least eight carbon atoms, the first carbon-carbon double bond being terminal and the second carbon-carbon double bond being non-conjugated to the first one, e.g., a diene which is selected from $C_8$- to $C_{14}$-non-conjugated diene or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof, e.g., from 1,7-octadiene, 1,9-decadiene, 1,11-dodecadiene, 1,13-tetradecadiene, or any mixture thereof; and wherein the polyolefin contains carbon-carbon double bonds/1000 carbon atoms in a total amount of at least 0.1; at least 0.2; at least 0.3 or alternatively, at least 0.4/1000 carbon atoms.

Furthermore, the polyolefin may be unsaturated, wherein the peroxide content may depend on the unsaturation degree.

A further embodiment of the present invention discloses a crosslinked polymer composition as described herein, wherein the polymer composition comprises, prior to crosslinking, less than 0.03 wt % 2,4-Diphenyl-4-methyl-1-pentene.

In still a further embodiment of the present invention a crosslinked polymer composition, as described herein, is disclosed, wherein the polymer composition comprises, prior to crosslinking, less than 0.01 wt % 2,4-Diphenyl-4-methyl-1-pentene.

In an even further embodiment of the present invention a crosslinked polymer composition as described herein is disclosed, wherein the polymer composition comprises, prior to crosslinking, no 2,4-Diphenyl-4-methyl-1-pentene.

Still a further embodiment of the present invention discloses a crosslinked polymer composition as described herein, wherein said polymer composition comprises, prior to crosslinking, neither any crosslinking booster(s) nor any scorch retarder additive(s). Said crosslinking booster(s) is/are understood, in this context, herein, to be low molecular weight crosslinking booster(s).

In a further embodiment of the present invention, a crosslinked polymer composition, as described herein, is disclosed, wherein said polyolefin is produced in a high pressure process, which process comprises the step of compressing one or more monomer(s) under pressure in a compressor, wherein a compressor lubricant comprising a mineral oil, e.g. a white mineral oil which meets the requirements given for white mineral oil in European Directive 2002/72/EC of 6 Aug. 2002, Annex V, for plastics used in food contact, is used for lubrication. In the context of a compressor lubricant comprising a mineral oil, refer to EP2499197, which document is hereby incorporated by reference.

A further embodiment of the present invention, discloses a crosslinked polymer composition, as described herein, wherein said polyolefin is produced in a high pressure process comprising
(a) compressing one or more monomer(s) under pressure in a compressor, wherein a compressor lubricant is used for lubrication,
(b) polymerising a monomer optionally together with one or more comonomer(s) in a polymerisation zone,
(c) separating the obtained polyolefin from the unreacted products and recovering the separated polyolefin in a recovery zone,
wherein in step a) the compressor lubricant comprises a mineral oil.

Still a further embodiment of the present invention, discloses a crosslinked polymer composition, as described herein, wherein said mineral oil is a white mineral oil which meets the requirements given for white mineral oil in European Directive 2002/72/EC of 6 Aug. 2002, Annex V, for plastics used in food contact.

In even further embodiments of the present invention, a crosslinked polymer composition, as described herein, is disclosed wherein said DC conductivity is 145 fS/m or less; 140 fS/m or less; 135 fS/m or less; or, alternatively, 130 fS/m or less.

A further embodiment of the present invention, discloses a layered structure which comprises a polymer layer and at least one semiconductive layer adjacent to said polymer layer, which polymer layer comprises a crosslinked polymer layer composition, wherein the crosslinked polymer layer composition comprises, prior to crosslinking, as described for the crosslinked polymer composition of the present invention, prior to crosslinking, as described herein, and wherein a sample of the crosslinked polymer layer composition, which has been in a direct contact with a semiconductive composition for 24 h at 70° C., shows an DC conductivity which is equal to, and measured in the same way as, the DC conductivity of the crosslinked polymer composition of the present invention, as described herein.

Still a further embodiment of the present invention, discloses a cable, e.g. a power cable, comprising a layered structure as described herein.

Further, the invention is also directed to a cable, e.g. a power cable, for example, a DC power cable, e.g., a HV DC or EHV DC power cable, which comprises a layered structure as described herein.

In still further embodiments of the present invention, a structured layer, as described herein, or a cable, as described herein, is disclosed, both obtainable by a method comprising the steps, in any order, of
exposing the polymer layer composition to a curing procedure during which the maximum temperature of the polymer layer composition is, for example, above 150° C., e.g. 160 to 350° C., whereby the polymer layer composition is crosslinked; and
providing at least one semiconductive layer adjacent to said polymer layer.

Furthermore, said curing procedure, as described herein, can be carried out at increased temperature of the polymer layer composition, which temperature is chosen, as well known, depending on the type of crosslinking agent. For instance temperatures above 150° C., e.g. 160 to 350° C., are typical, however without limiting thereto.

A further embodiment of the present invention discloses a curing procedure, as described herein, during which the maximum temperature of said polymer layer composition is, for example, above 150° C., e.g. 160 to 350° C., e.g. less than 280° C., e.g. 250° C. or less, or, for example, 180° C. or less.

An even further embodiment of the present invention discloses a curing procedure, as described herein, during which the maximum temperature of said polymer layer composition is 270° C. or less, 260° C. or less, 250° C. or less, 240° C. or less, 230° C. or less, 220° C. or less, 210° C. or less, 200° C. or less, 190° C. or less, or, alternatively, 180° C. or less.

Still a further embodiment of the present invention discloses a curing procedure, as described herein, during which the maximum temperature of said polymer layer composition is 270° C. or less, 265° C. or less, 260° C. or less, 255° C. or less, 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

An even further embodiment of the present invention discloses a curing procedure, as described herein, during which the maximum temperature of said polymer layer composition is 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

A further embodiment of the present invention discloses a curing procedure, as described herein, during which the maximum temperature of said polymer layer composition is 180° C. or less.

Still a further embodiment of the present invention discloses a curing procedure, as described herein, during which the maximum temperature of said polymer layer composition is at least 150° C. or, alternatively, at least 160° C.

A further embodiment of the present invention discloses the use of a crosslinked polymer composition, as described herein, or the use of a structured layer, as described herein, both, for producing a crosslinked power cable, e.g., a crosslinked DC power cable, which power cable further comprises a conductor.

The invention is also directed to a process for producing a cable, for example, a power cable, e.g., a crosslinked DC power cable, as described herein, and to a process for producing a structured layer, as described herein.

Polyolefin

The following exemplified embodiments, properties and subgroups of the polyolefin component suitable for the polymer composition (suitable as well as for the polymer layer composition, but in this section both are referred to as the polymer composition), are generalisable so that they can be used in any order or combination to further define the exemplified embodiments of the polymer composition. Moreover, it is evident that the given description applies to the polyolefin before it is crosslinked.

The term polyolefin means both an olefin homopolymer and a copolymer of an olefin with one or more comonomer(s). As well known "comonomer" refers to copolymerizable comonomer units.

The polyolefin can be any polyolefin, such as any conventional polyolefin, which is suitable as a polymer in a layer, for example, an insulating layer of an electrical cable, e.g., of a power cable.

The polyolefin can be e.g. a commercially available polymer or can be prepared according to or analogously to known polymerisation process described in the chemical literature.

Furthermore, the polyolefin may suitably be a polyethylene produced in a high pressure (HP) process, for example, a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like high pressure (HP) polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin may be a low density homopolymer of ethylene (referred herein as LDPE homopolymer) or a low density copolymer of ethylene with one or more comonomer(s) (referred herein as LDPE copolymer). The one or more comonomers of LDPE copolymer may suitably be selected from the polar comonomer(s), non-polar comonomer(s) or from a mixture of the polar comonomer(s) and non-polar comonomer(s), as defined herein. Moreover, said LDPE homopolymer or LDPE copolymer as said polyolefin may optionally be unsaturated.

As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can be used. In a further embodiment, comonomer(s) containing carboxyl and/or ester group(s) are used as said polar comonomer. In still a further embodiment, the polar comonomer(s) of LDPE copolymer is selected from the groups of acrylate(s), methacrylate(s) or acetate(s), or any mixtures thereof. If present in said LDPE copolymer, the polar comonomer(s) may, for example, be selected from the group of alkyl acrylates, alkyl methacrylates or vinyl acetate, or a mixture thereof. In a further embodiment, said polar comonomers may be selected from $C_1$- to $C_6$-alkyl acrylates, $C_1$- to $C_6$-alkyl methacrylates or vinyl acetate. In even a further embodiment, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomer(s) other than the above defined polar comonomers can be used. In a further embodiment, the non-polar comonomers are other than comonomer(s) containing hydroxyl group(s), alkoxy group(s), carbonyl group(s), carboxyl group(s), ether group(s) or ester group(s). One group of exemplified non-polar comonomer(s) comprise, may suitably consist of, monounsaturated (= one double bond) comonomer(s), for example, olefins, e.g. alpha-olefins, for example, $C_3$ to $C_{10}$ alpha-olefins, such as propylene, 1-butene, 1-hexene, 4-methyl-1-pentene, styrene, 1-octene, 1-nonene; polyunsaturated (= more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it suitably comprises 0.001 to 50 wt %, for example, 0.05 to 40 wt %, e.g., less than 35 wt %, for example, less than 30 wt %, e.g., less than 25 wt %, of one or more comonomer(s).

The polymer composition, suitably the polyolefin component thereof, for example, the LDPE polymer, may optionally be unsaturated, i.e. the polymer composition, suitably the polyolefin, for example, the LDPE polymer, may comprise carbon-carbon double bonds. The "unsaturated" means herein that the polymer composition, suitably the polyolefin, contains (prior to crosslinking of the polymer composition) carbon-carbon double bonds/1000 carbon atoms in a total amount of at least 0.1; at least 0.2; at least 0.3 or alternatively, at least 0.4/1000 carbon atoms.

As well known, the unsaturation can be provided to the polymer composition i.a. by means of the polyolefin, a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the polymer composition means the sum of the double bonds present in the double-bond sources. It is evident that a characteristic model compound for calibration is used for each chosen source to enable the quantitative infrared (FTIR) determination. Any double bond measurements are carried out prior to crosslinking.

If the polymer composition is unsaturated prior to crosslinking, then it is suitable that the unsaturation originates at least from an unsaturated polyolefin component. For example, the unsaturated polyolefin is an unsaturated polyethylene, e.g., an unsaturated LDPE polymer, for example, an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In an embodiment of the present invention the term "total amount of carbon-carbon double bonds" is defined from the unsaturated polyolefin, and refers, if not otherwise specified, to the combined amount of double bonds which originate from vinyl groups, vinylidene groups and trans-vinylene groups, if present. Naturally the polyolefin does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerisation conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is suitably an unsaturated LDPE copolymer of ethylene with at least one polyunsaturated comonomer, and optionally with other comonomer(s), such as polar comonomer(s) which is suitably selected from acrylate or acetate comonomer(s). For example, an unsaturated LDPE copolymer is an unsaturated LDPE copolymer of ethylene with at least polyunsaturated comonomer(s).

The polyunsaturated comonomers suitable for the unsaturated polyolefin consist, for example, of a straight carbon chain with at least 8 carbon atoms and at least 4 carbons between the non-conjugated double bonds, of which at least one is terminal, e.g., said polyunsaturated comonomer is a diene, preferably a diene which comprises at least eight carbon atoms, the first carbon-carbon double bond being terminal and the second carbon-carbon double bond being non-conjugated to the first one. Exemplified dienes are selected from $C_8$ to $C_{14}$ non-conjugated dienes or mixtures thereof, e.g., selected from 1,7-octadiene, 1,9-decadiene, 1,11-dodecadiene, 1,13-tetradecadiene, 7-methyl-1,6-octadiene, 9-methyl-1,8-decadiene, or mixtures thereof. The diene is, for example, selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, for example, to the total amount of the vinyl groups. Herein, when a compound which can also act as comonomer, such as propylene, is used as CTA for providing double bonds, then said copolymerisable comonomer is not calculated to the comonomer content.

If the polyolefin, for example, the LDPE polymer, is unsaturated, then it has, e.g., a total amount of carbon-carbon double bonds, which originate from vinyl groups, vinylidene groups and trans-vinylene groups, if present, of more than 0.1; more than 0.2; more than 0.3; more than 0.4 or, alternatively, more than 0.5/1000 carbon atoms. The upper limit of the amount of carbon-carbon double bonds present in the polyolefin is not limited and may, for example, be less than 5.0/1000 carbon atoms, e.g., less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is suitably higher than 0.50/1000 carbon atoms, suitably higher than 0.60/1000 carbon atoms. Such higher amount of double bonds is suitable e.g. if high cable production speed is desired and/or it would be desirable to minimise or to avoid sagging problems, and/or deformation, which may occur e.g. depending on the desired end application and/or the cable production process. Higher double bond content combined with "low" peroxide content of the invention is also suitable in cable embodiments, such as in DC power cables, where very demanding mechanical and/or heat resistance properties are needed for the layer, for example insulation layer, material.

Further, the polyolefin is, for example, unsaturated and contains at least vinyl groups and the total amount of vinyl groups is, for example, higher than 0.01/1000 carbon atoms, e.g., higher than 0.05/1000 carbon atoms, for example, higher than 0.08/1000 carbon atoms, and, e.g., higher than 0.11/1000 carbon atoms. Furthermore, the total amount of vinyl groups is, for example, lower than 4.0/1000 carbon atoms. The polyolefin, prior to crosslinking, contains vinyl groups in total amount of, for example, more than 0.20/1000 carbon atoms, e.g., more than 0.30/1000 carbon atoms, and, for example, more than 0.40/1000 carbon atoms. In some demanding embodiments, for example, in power cables, e.g., in DC power cables, at least one layer, for example an insulation layer, comprises LDPE polymer, e.g., LDPE copolymer, which contains vinyl groups in total amount of more than 0.50/1000 carbon atoms.

Further, the invention is directed to a crosslinked polymer composition as described herein, wherein the polyolefin contains, prior to the crosslinking, at least vinyl groups and the total amount of vinyl groups is higher than 0.01/1000 carbon atoms, e.g., higher than 0.05/1000 carbon atoms, for example, higher than 0.08/1000 carbon atoms, and, e.g., higher than 0.11/1000 carbon atoms.

The unsaturation has shown to further contribute to said desirable balance of low DC conductivty and mechanical properties. In an embodiment of the present invention, the polyolefin of the polymer composition is an unsaturated LDPE copolymer of ethylene with at least one polyunsaturated comonomer, e.g., a diene as defined above, and optionally with other comonomer(s), and has the total amount of carbon-carbon double bonds, which originate from vinyl groups, vinylidene groups and trans-vinylene groups, if present, as defined above, has, for example, the total amount of vinyl groups as defined above. Said unsaturated LDPE copolymer is highly usable for the method for further reducing the DC-conductivity of a crosslinked polymer composition, for example, of an insulation layer of a power cable, e.g., of a DC power cable.

Typically, and suitably in wire and cable (W&C) applications, the density of the polyolefin, for example, of the LDPE polymer, is higher than 860 kg/m$^3$. The density of the polyolefin, e.g., of the LDPE polymer, the ethylene homo- or copolymer is, for example, not higher than 960 kg/m$^3$, and is, e.g., from 900 to 945 kg/m$^3$. The MFR$_2$ (2.16 kg, 190° C.) of the polyolefin, for example, of the LDPE polymer, e.g., from 0.01 to 50 g/10 min, for example, is from 0.1 to 20 g/10 min, and, e.g., is from 0.2 to 10 g/10 min.

Accordingly, the polyolefin of the invention is, for example, produced at high pressure by free radical initiated polymerisation (referred to as high pressure (HP) radical polymerisation). The HP reactor can be e.g. a well known tubular or autoclave reactor or a mixture of a tubular and an autoclave reactor. In an embodiment of the present invention the HP reactor is a tubular reactor. The polyolefin is, for example, unsaturated LDPE homopolymer or LDPE copolymer of ethylene with one or more comonomer(s), as defined above. The LDPE polymer obtainable by the process of the invention provides, e.g., the advantageous electrical properties as defined herein. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., for example, from 80 to 350° C. and pressure from 70 MPa, for example, 100 to 400 MPa, e.g., from 100 to 350 MPa. Pressure can be measured at least after compression stage and/or after the tubular reactor. Temperature can be measured at several points during all steps.

After the separation the obtained polymer is typically in a form of a polymer melt which is normally mixed and palletized in a palletizing section, such as palletizing extruder, arranged in connection to the HP reactor system. Optionally, additive(s), such as antioxidant(s), can be added in this mixer in a known manner to result in the polymer composition.

Further details of the production of ethylene (co)polymers by high pressure radical polymerisation can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, for example ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes.

Polymer Composition (or Polymer Layer Composition, but Both Referred to as Polymer Composition Also in this Section)

Prior to crosslinking the polymer composition comprises at least one peroxide, optionally, in the presence of an antioxidant, and wherein the "at least one" peroxide contains at least one —O—O— bond.

Naturally, in case where two or more different peroxide products are used in the polymer composition, then amount (in mmol) of —O—O—/kg polymer composition as defined above, below or in claims is the sum of the amount of —O—O—/kg polymer composition of each peroxide product. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy) hexane, 1,1-di(tert-butylperoxy)cyclohexane, 1,1-di(tert amylperoxy)cyclohexane, or any mixtures thereof, can be mentioned. Further, the peroxide is, for example, selected from 2,5-di(tert-butylperoxy)-2,5-dimethylhexane, di(tert-butylperoxyisopropyl)benzene, dicumylperoxide, tert-butyl-cumylperoxide, di(tert-butyl)peroxide, or mixtures thereof. Furthermore, the peroxide is, e.g., dicumylperoxide.

Moreover, prior to crosslinking the crosslinked polymer composition of the invention contains less than 0.05 wt % 2,4-Diphenyl-4-methyl-1-pentene.

Additionally, prior to crosslinking the crosslinked polymer composition of the invention may contain, in addition to the polyolefin and the peroxide(s), antioxidant(s), less than 0.05 wt % 2,4-Diphenyl-4-methyl-1-pentene, and further component(s) such as polymer component(s) and/or additive(s), exemplified additive(s), such as, stabiliser(s), processing aid(s), flame retardant additive(s), water tree retardant additive(s), acid or ion scavenger(s), inorganic filler(s) and voltage stabiliser(s), as known in the polymer field. The used amounts of additives are conventional and well known to a skilled person, e.g. as already described herein.

The polymer composition of the invention comprises typically at least 50 wt %, for example, at least 60 wt %, e.g. at least 70 wt %, e.g., at least 75 wt %, for example, from 80 to 100 wt % and, for example, from 85 to 100 wt %, of the polyolefin based on the total weight of the polymer component(s) present in the polymer composition. The exemplified polymer composition consists of polyolefin as the only polymer component. It is to be understood herein that the polymer composition may comprise further components other than polymer components, such as additives, in line with the additives as already described herein, which may optionally be added in a mixture with a carrier polymer, i.e. in so called master batch.

The polymer composition suitably consists of the polyolefin, for example, polyethylene, e.g., LDPE homo or copolymer, which may optionally be unsaturated before crosslinking, as the sole polyolefin component.

End Uses and End Applications of the Invention

The new crosslinked polymer composition of the invention is highly useful in wide variety of end applications of polymers. Exemplified uses of the crosslinked polymer composition are in W&C applications, for example, in one or more layers of a power cable.

A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables operating at voltages higher than 320 kV, such cables cover high voltage (HV) and extra high voltage (EHV) power cables were EHV cables operate at even higher voltages. The above terms have well known meanings and thus indicate the operating level of such cables. For HV DC and EHV DC power cables the operating voltage is defined herein as the electric voltage between ground and the conductor of the high voltage cable. Typically a HV DC power cable operate at voltages of 40 kV or higher, even at voltages of 50 kV or higher. A power cable operating at very high voltages far above that is known in the art as EHV DC power cable which in practice can be as high as, but not limited to, 900 kV.

The crosslinked polymer composition is highly suitable for use as a layer material for an AC or DC power cable, for example, for a DC power cable, e.g., for a DC power cable operating at voltages at higher than 320 kV, such as well known HV DC or EHV DC power cable, as defined above.

A power cable, for example, a DC power cable, is provided comprising a conductor surrounded by one or more layers, for example, at least an insulation layer, e.g., at least an inner semiconductive layer, an insulation layer and an outer semiconductive layer, in that order, wherein at least one of said layer(s), for example, the insulation layer, comprises a crosslinked polymer composition, as defined herein.

The insulation layer of the power cable, for example, of the DC power cable, e.g., comprises said crosslinked unsaturated LDPE copolymer as defined above.

The term "conductor" means herein above and below that the conductor comprises one or more wires. Moreover, the cable may comprise one or more such conductors. For example the conductor is an electrical conductor and comprises one or more metal wires.

As well known the cable can optionally comprise further layers, e.g. layers surrounding the insulation layer or, if present, the outer semiconductive layers, such as screen(s), a jacketing layer, other protective layer(s) or any combinations thereof.

For example, in an embodiment, a crosslinkable DC power cable, e.g., a crosslinkable HV DC power cable, of the invention is disclosed, comprising a conductor surrounded by an inner semiconductive layer, an insulation layer, and an outer semiconductive layer, in that order, is produced, wherein the process comprises the steps of (a)
  providing and mixing, for example, melt mixing in an extruder, a crosslinkable first semiconductive composition comprising a polymer, a carbon black and optionally further component(s) for the inner semiconductive layer,
  providing and mixing, for example, melt mixing in an extruder, a crosslinkable polymer composition of the invention for the insulation layer,
  providing and mixing, for example, melt mixing in an extruder, a second semiconductive composition which is, e.g., crosslinkable and comprises a polymer, a carbon black and optionally further component(s) for the outer semiconductive layer,
(b) applying on a conductor, for example, by co-extrusion,
  a melt mix of the first semiconductive composition obtained from step (a) to form the inner semiconductive layer,
  a melt mix of polymer composition of the invention obtained from step (a) to form the insulation layer, and
  a melt mix of the second semiconductive composition obtained from step (a) to form the outer semiconductive layer, and
(c) optionally crosslinking at crosslinking conditions one or more of the polymer composition of the insulation layer, the semiconductive composition of the inner semiconductive layer and the semiconductive composition of the outer semiconductive layer, of the obtained cable, for example, at least the polymer composition of the insulation layer, e.g., the polymer composition of the insulation layer, the semiconductive composition of the inner semiconductive layer and the semiconductive composition of the outer semiconductive layer.

The polymer of the first and the second semiconductive composition is, for example, a polyolefin as described in relation to the polymer composition of the invention or a different polyolefin.

Further, the carbon black of the first and the second semiconductive composition may be any carbon black which is electrically conducting. The carbon black may, suitably, have one or more of the following properties: a) a primary particle size of at least 5 nm which is defined as the number average particle diameter according ASTM D3849-95a, b) iodine number of at least 30 mg/g according to ASTM D1510, c) oil absorption number of at least 30 ml/100 g which is measured according to ASTM D2414. Non limiting examples of suitable carbon blacks include furnace blacks and acetylene blacks.

One example of a group of furnace blacks has a primary particle size of 28 nm or less. The mean primary particle size is defined as the number average particle diameter measured according to ASTM D3849-95a. Furnace blacks of this category, may, for example, have an iodine number between 60 and 300 mg/g according to ASTM D1510. Further, the oil absorption number (of this category) may, for example, be between 50 and 225 ml/100 g, e.g. between 50 and 200 ml/100 g which may be measured according to ASTM D2414.

Another example of a group of furnace blacks has a primary particle size of greater than 28 nm. The mean primary particle size is defined as the number average particle diameter according to ASTM D3849-95a. Furnace blacks of this category may, for example, have an iodine number between 30 and 200 mg/g according to ASTM D1510. Furthermore, the oil absorption number (of this category) may, e.g., be between 80 and 300 ml/100 g measured according to ASTM D2414.

Other suitable carbon blacks can be made by any other process or can be further treated. Suitable carbon blacks for said first and second semiconductive composition may, for example, be characterized by their cleanliness. Therefore, a group of suitable carbon blacks thereof, may have an ash-content of less than 0.2 wt % measured according to ASTM D1506, a 325 mesh sieve residue of less than 30 ppm according to ASTM D1514 and have less than 1 wt % total sulphur according to ASTM D1619.

Furnace carbon black is a generally acknowledged term for the well known carbon black type that is produced in a furnace-type reactor. As examples of carbon blacks, the preparation process thereof and the reactors, reference is made to e.g. EP629222 of Cabot, U.S. Pat. Nos. 4,391,789, 3,922,335 and 3,401,020. As examples of commercial furnace carbon black grades described in ASTM D 1765-98b i.a. N351, N293 and N550, can be mentioned.

Furnace carbon blacks are conventionally distinguished from acetylene carbon blacks which are another suitable carbon black type which may be suitable for a semiconductive composition. Acetylene carbon blacks are produced in an acetylene black process by reaction of acetylene and unsaturated hydrocarbons, e.g. as described in U.S. Pat. No. 4,340,577. A group of suitable acetylene blacks may have a particle size of larger than 20 nm, e.g. 20 to 80 nm. The mean primary particle size is defined as the number average particle diameter according to the ASTM D3849-95a. Further, suitable acetylene blacks of this category have an iodine number between 30 to 300 mg/g, e.g. 30 to 150 mg/g according to ASTM D1510. Furthermore, the oil absorption number (of this category) may, for example, be between 80 to 300 ml/100 g, e.g. 100 to 280 ml/100 g and this is measured according to ASTM D2414. Acetylene black is a generally acknowledged term and are very well known and e.g. supplied by Denka.

Moreover said first and second semiconductive compositions may, for example, be identical.

Melt mixing means mixing above the melting point of at least the major polymer component(s) of the obtained mixture and is typically carried out in a temperature of at least 10-15° C. above the melting or softening point of polymer component(s).

The term "(co)-extrusion" means herein that in case of two or more layers, said layers can be extruded in separate steps, or at least two or all of said layers can be coextruded in a same extrusion step, as well known in the art. The term "(co)-extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and exemplified first and second semiconductive compositions can be produced before or during the cable production process. Moreover the polymer composition of the invention and the optional and exemplified first and second semiconductive composition can each independently comprise part or all of the component(s) thereof before introducing to the (melt) mixing step a) of the cable production process.

The mixing step (a) of the provided polymer composition of the invention and of the exemplified first and second semiconductive compositions is, for example, carried out in a cable extruder. The step a) of the Cable production process may optionally comprise a separate mixing step, e.g. in a mixer arranged in connection and preceding the cable extruder of the Cable production line. Mixing in the preceding separate mixer can be carried out by mixing with or without external heating (heating with an external source) of the component(s). In case the peroxide(s), the antioxidant(s), less than 0.05 wt % 2,4-Diphenyl-4-methyl-1-pentene and part or all of the optional further component(s), such as further additive(s), of the polymer composition of the invention and of the optional and exemplified first and second semiconductive compositions, are added to the polyolefin during the cable production process, then the addition(s) can take place at any stage during the mixing step (a), e.g. at the optional separate mixer preceding the cable extruder or at any point(s) of the cable extruder. The addition of peroxide (s), the antioxidant(s), less than 0.05 wt % 2,4-Diphenyl-4-methyl-1-pentene and optional additive(s) can be made simultaneously or separately as such, suitably in liquid form, or in a well known master batch, and at any stage during the mixing step (a).

The polymer composition and the optional first and second semiconductive composition may, for example, be used in form of powder, grain or pellets when provided to the cable production process. Pellets can be of any size and shape.

Further, the melt mix of the polymer composition may, for example, be obtained from melt mixing step consists of the polyolefin of the invention as the sole polymer component. The optional, and exemplified, additive(s) can be added to polymer composition as such or as a mixture with a carrier polymer, i.e. in a form of so-called master batch.

The processing temperatures and devices are well known in the art, e.g. conventional mixers and extruders, such as single or twin screw extruders, are suitable for the process of the invention.

The thickness of the insulation layer of the power cable, for example, of the DC cable, e.g., of the HV DC or EHV DC power cable, is typically 2 mm or more, for example, at least 3 mm, e.g., of at least 5 to 100 mm, for example, from 5 to 50 mm, when measured from a cross section of the insulation layer of the cable.

Determination Methods

Unless otherwise stated in the description or experimental part the following methods were used for the property determinations.

wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-1/ method A. The sample preparation was executed according to ISO 1872-2 Table 3 Q (compression moulding).

Comonomer Contents a) Quantification of alpha-olefin content in linear low density polyethylenes and low density polyethylenes by NMR spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer content of polar comonomers in low density polyethylene (1) Polymers containing >6 wt % polar comonomer units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalized with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate} - A_{2475}$). Then the maximum absorbance peak for the polyethylene peak at 2660 cm$^{-1}$ was subtracted with the absorbance value for the base line at 2475 cm$^{-1}$ (A$_{2660}$–A$_{2475}$). The ratio between (A$_{methylacrylate}$–A$_{2475}$) and (A$_{2660}$–A$_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt % or Less Polar Comonomer Units

Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ (A$_{polar\ comonomer}$–A$_{1850}$)—Then the maximum absorbance peak for polyethylene peak at 2660 cm$^{-1}$ was subtracted with the absorbance value for the base line at 1850 cm$^{-1}$ (A$_{2660}$–A$_{1850}$). The ratio between (A$_{comonomer}$–A$_{1850}$) and (A$_{2660}$–A$_{1850}$) was then calculated. The NMR spectroscopy calibration procedure was undertaken in the conventional manner which is well documented in the literature, as described above under method 1).

The weight-% can be converted to mol-% by calculation, and how to do this is well documented in the literature.

Crystallinity and melting temperature was measured with DSC using a TA Instruments Q2000. The temperature program used was starting at 30° C., heating to 180° C., an isotherm at 180° C. for 2 min and then cooling to −15° C., an isotherm at −15° C. for 2 min and then heating to 180° C. The heating and cooling rates are 10° C./min.

Samples which are crosslinked were all crosslinked at 180° C. for 10 min and then degassed in vacuum at 70° C. over night to remove all peroxide by-products before the crystallinity and melt temperature were measured.

Melting temperature, T$_m$, is the temperature where the heat flow to the sample is at its maximum.

The degree of crystallinity, Crystallinity %, =100×ΔHf/ΔH100% where ΔH100% (J/g) is 290.0 for PE (L. Mandelkem, Macromolecular Physics, Vol. 1-3, Academic Press, New York 1973, 1976 &1980) The evaluation of crystallinity was done from 20° C.

DC Conductivity Method

Plaques were compression moulded from pellets of the polymer compositions to be tested. Further, plaques were also compression moulded from pellets of a semiconductive polymer composition. The plaques, consisting of the polymer compositions to be tested, did have a thickness of 1 mm and a diameter of 260 mm and the plaques, consisting of the semiconductive polymer composition, did have a thickness of 0.3 mm and a diameter of 260 mm.

The plaques, consisting of the polymer compositions to be tested, and the plaques, consisting of the semiconductive polymer composition, respectively, were prepared by press-moulding at 130° C. for 600 s and 2.6 MPa. Thereafter the temperature was increased and reached 180° C. or 250° C. after 5 min. The temperature was then kept constant at 180° C. or 250° C. for 1000 s during which the plaques became fully crosslinked by means of the peroxide present in the test polymer composition. Finally, the temperature was then decreased using the cooling rate 15° C./min until room temperature was reached and the pressure was then released.

In a conditioning step, one plaque, consisting of the crosslinked polymer composition to be tested, and one plaque, consisting of the semiconductive polymer composition, were stored together in direct contact with each other in a closed aluminium bag at 70° C. for 24 hours.

A pressure of 1530 Pa was applied on top of the plaques during storage using a weight. After the conditioning step the plaques were separated and DC conductivity measurement was performed on the plaque, consisting of the crosslinked polymer composition to be tested.

A high voltage source was connected to the upper electrode, to apply voltage over the test sample, i.e. the plaque, consisting of the crosslinked polymer composition to be tested. The resulting current through the sample was measured with an electrometer/picoammeter. The measurement cell was a three electrodes system with brass electrodes placed in a heating oven circulated with dried compressed air to maintain a constant humidity level.

The diameter of the measurement electrode was 100 mm. Precautions were made to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the test sample, i.e. the plaque, consisting of the crosslinked polymer composition to be tested.

Method for Determination of the Amount of Double Bonds in the Polymer Composition or in the Polymer Quantification of the Amount of Carbon-Carbon Double Bonds by IR Spectroscopy Quantitative infrared (IR) spectroscopy was used to quantify the amount of carbon-carbon double bonds (C=C). Specifically solid-state transmission FTIR spectroscopy was used (Perkin Elmer 2000). Calibration was achieved by prior determination of the molar extinction coefficient of the C=C functional groups in representative low molecular weight model compounds of know structure.

The amount of a given C=C functional group containing species (N) was defined as number of carbon-carbon double bonds per thousand total carbon atoms (C=C/1000C) according to:

$$N=(A\times14)/(E\times L\times D)$$

were A is the maximum absorbance defined as peak height, E the molar extinction coefficient of the group in question (1·mol$^{-1}$·mm$^{-1}$), L the film thickness (mm) and D the density of the material (g·cm$^{-1}$).

For systems containing unsaturation three types of C=C containing functional groups were considered, each with a characteristic C=C—H out-of-plain bending vibrational mode, and each calibrated to a different model compound resulting in individual extinction coefficients:

vinyl (R—CH=CH2) via at around 910 cm-1
  based on 1-decene [dec-1-ene] giving E=13.13 l·mol-1·mm-1
vinylidene (RR'C=CH2) at around 888 cm-1
  based on 2-methyl-1-heptene [2-methyhept-1-ene] giving E=18.24 l·mol·l·mm-1
trans-vinylene (R—CH=CH—R') at around 965 cm-1
  based on trans-4-decene [(E)-dec-4-ene] giving E=15.14 l·mol·l·mm-1

The specific wavenumber of this absorption was dependant on the specific chemical structure of the species. When non-aliphatic unsaturated group were addressed the molar extinction coefficient was taken to be the same as that of their related aliphatic unsaturated group, as determined using the aliphatic small molecule analogue.

The molar extinction coefficient was determined according to the procedure given in ASTM D3124-98 and ASTM D6248-98. Solution-state infrared spectra were recorded on standard solutions using a FTIR spectrometer (Perkin Elmer 2000) equipped with a 0.1 mm path length liquid cell at a resolution of 4 cm$^{-1}$. The molar extinction coefficient (E) was determined as l·mol$^{-1}$·mm$^{-1}$ via:

$$E=A/(C\times L)$$

were A is the maximum absorbance defined as peak height, C the concentration (mol·l$^{-1}$) and L the cell thickness (mm). At least three 0.18 mol·l$^{-1}$ solutions in carbondisulphide (CS$_2$) were used and the mean value of the molar extinction coefficient determined.

Experimental Part

Preparation of Polymers of the Examples of the Present Invention and the Comparative Example All polymers were low density polyethylenes produced in a high pressure reactor. As to CTA feeds, e.g. the PA content can be given as liter/hour or kg/h and converted to either units using a density of PA of 0.807 kg/liter for the recalculation.

LDPE1:

Ethylene with recycled CTA was compressed in a 5-stage precompressor and a 2-stage hyper compressor (using mineral oil) with intermediate cooling to reach initial reaction pressure of ca 2628 bar. The total compressor throughput was ca 30 tons/hour. In the compressor area approximately 4.9 litres/hour of propion aldehyde (PA, CAS number: 123-38-6) was added together with approximately 81 kg propylene/hour as chain transfer agents to maintain an MFR of 1.89 g/10 min. Here also 1,7-octadiene was added to the reactor in amount of 27 kg/h. The compressed mixture was heated to 157° C. in a preheating section of a front feed two-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 275° C. after which it was cooled to approximately 200° C. The subsequent 2nd peak reaction temperature was 264° C. The reaction mixture was depressurized by a kick valve, cooled and polymer was separated from unreacted gas.

The components of the crosslinked polymer compositions of inventive examples (Inv. Ex.) 1 to 2, reference example (Ref. Ex.) 1 to 2 (represents the prior art polymer composition crosslinked with a conventional amount of peroxide and with 2,4-Diphenyl-4-methyl-1-pentene present) and the properties and experimental results of the compositions are given in table 1.

The used additives are commercially available:

Peroxide: DCP=dicumyl peroxide (CAS no. 80-43-3)

Antioxidants: 4,4'-thiobis (2-tertbutyl-5-methylphenol) (CAS number: 96-69-5).

Additive: 2,4-Diphenyl-4-methyl-1-pentene (CAS-no. 6362-80-7).

The amount of DCP is given in mmol of the content of —O—O— functional group per kg polymer composition. The amounts are also given in brackets as weight % (wt %).

The semiconductive polymer composition which is used in the Examples herein is the grade LE0550 commercially available from *Borealis*.

TABLE 1

The properties of the compositions of the inventive and reference examples:

| CROSSLINKED POLYMER COMPOSITION: | Ref. Ex. 1 | Ref. Ex. 2 | Inv. Ex. 1 | Inv. Ex. 2 |
|---|---|---|---|---|
| Base resin | LDPE1 | LDPE1 | LDPE1 | LDPE1 |
| 4,4'-thiobis (2-tertbutyl-5-methylphenol) (antioxidant) [wt %] | 0.08 | 0.08 | 0.08 | 0.08 |
| DCP [wt %] | 1.2 | 1.2 | 0.55 | 0.55 |
| mmol of —O—O—/kg polymer composition | 44 | 44 | 20 | 20 |
| 2,4-Diphenyl-4-methyl-1-pentene (scorch retarder) [wt %] | 0.3 | 0.3 | 0 | 0 |
| Cross-linking temp [° C.] | 180 | 250 | 180 | 250 |
| Plaque conductivity at 30 kV/mm and 70° C. (not degassed, without any contact with semicon layer) [fS/m] | 163 | 113 | 13 | 18 |
| Plaque conductivity at 30 kV/mm and 70° C. (not degassed, after contact with semicon layer at 70° C. for 24 hours) [fS/m] | 344 | 1241 | 102 | 106 | wt %-values given in the table based on the total amount of the polymer composition.

TABLE 2

Properties of the polyolefin components

| Base Resin Properties | LDPE1 |
|---|---|
| MFR 2.16 kg, at 190° C. [g/10 min] | 1.89 |
| Density [kg/m$^3$] | 923 |

TABLE 2-continued

Properties of the polyolefin components

| Base Resin Properties | LDPE1 |
|---|---|
| Vinyl [C = C/1000C] | 0.54 |
| Vinylidene [C = C/1000C] | 0.16 |
| Trans-vinylene [C = C/1000C] | 0.06 |
| Crystallinity [%] | 48.8 |
| Melting point, $T_m$ [° C.] | 110.2 |

Table 1 shows that the DC-conductivity of the inventive crosslinked polymer compositions (Inv. Ex. 1-2) are significantly reduced compared to the reference examples (Ref. Ex. 1-2). For example, when crosslinked at 250° C. (which is a rather realistic cross-linking temperature of XLPE power cables), the DC-conductivity of the crosslinked polymer composition of the present invention is less than a tenth of the electrical conductivity of reference examples. Thus, the crosslinked polymer composition of the present invention is far more robust towards unfavourable interaction from the adjacent semicon layer, which renders the crosslinked polymer composition of the present invention superior for HVDC cables where low DC-conductivity is a key requirement in order to prevent that thermal runaway occurs.

The invention claimed is:

1. A cable comprising a polymer layer and at least one semiconductive layer adjacent to the polymer layer,
wherein the polymer layer comprises a crosslinked polymer composition, wherein the polymer composition comprises, prior to crosslinking,
a first low density polyethylene (LDPE),
an antioxidant,
a peroxide in an amount of less than 35 mmol —O—O-/kg polymer composition, and
no 2,4-diphenyl-4-methyl-1-pentene;
wherein the semiconductive layer comprises a second low density polyethylene (LDPE) and carbon black;
characterized in that when the crosslinked polymer composition has been in a direct contact with a semiconductive composition for 24 h at 70° C., the crosslinked polymer composition thereafter has an electrical DC-conductivity of 130 fS/m or less;
wherein the electrical DC-conductivity is measured in accordance with "DC conductivity method", as described under "Determination methods", on a plaque of the crosslinked polymer composition at 70° C. and 30 kV/mm mean electric field from a non-degassed and 1 mm thick plaque sample of the crosslinked polymer composition.

2. The cable according to claim 1, wherein the polymer composition, prior to crosslinking, comprises the peroxide in an amount of 34 mmol —O—O-/kg polymer composition or less.

3. The cable according to claim 1, wherein the first LDPE and/or the second LDPE is an optionally unsaturated LDPE homopolymer or an optionally unsaturated LDPE copolymer of ethylene with one or more comonomer(s).

4. The cable according to claim 1, wherein the first LDPE and/or the second LDPE is an unsaturated LDPE copolymer of ethylene with at least one polyunsaturated comonomer and optionally with one or more other comonomer(s),
wherein the at least one polyunsaturated comonomer consists of a straight carbon chain with at least 8 carbon atoms and at least 4 carbons between the non-conjugated double bonds, of which at least one is terminal, and
wherein the first LDPE and/or the second LDPE contains carbon-carbon double bonds/1000 carbon atoms in a total amount of at least 0.1/1000 carbon atoms.

5. The cable according to claim 1, wherein the first LDPE contains, prior to the crosslinking, at least vinyl groups and the total amount of vinyl groups is higher than 0.01/1000 carbon atoms.

6. The cable according to claim 1, wherein the first LDPE and/or the second LDPE is produced in a high pressure process, wherein the high pressure process comprises a step of compressing one or more monomer(s) under pressure in a compressor, wherein a compressor lubricant comprising a mineral oil is used for lubrication in the compressor.

7. A method of making the cable according to claim 1, the method comprising the steps, in any order, of
exposing a polymer layer composition comprising the first low density polyethylene, the peroxide in an amount of less than 35 mmol —O—O-/kg polymer composition, and no 2,4-diphenyl-4-methyl-1-pentene to a curing procedure during which the maximum temperature of the polymer layer composition is above 150° C., whereby the polymer layer composition is crosslinked to form the crosslinked polymer composition; and
providing the at least one semiconductive layer comprising the second LDPE and carbon black adjacent to said polymer layer.

8. The cable according to claim 4, wherein said at least one polyunsaturated comonomer is a diene which comprises at least eight carbon atoms, a first carbon-carbon double bond, and a second carbon-carbon double bond, the first carbon-carbon double bond being terminal and the second carbon-carbon double bond being non-conjugated to the first carbon-carbon double bond.

9. The cable of claim 8, wherein the diene is selected from the group consisting of $C_8$- to $C_{14}$-non-conjugated dienes and mixtures thereof.

10. The cable of claim 9, wherein the diene is selected from the group consisting of 1,7-octadiene, 1,9-decadiene, 1,11-dodecadiene, 1,13-tetradecadiene, 7-methyl-1,6-octadiene, 9-methyl-1,8-decadiene, and mixtures thereof.

* * * * *